3,234,202
SEPARATING WAX PRODUCTS FROM AQUEOUS ALKALINE TREE BARK EXTRACTS AND PRODUCTS
David L. Brink, Berkeley, Calif., and Lionel E. Dowd and Donald F. Root, Longview, Wash., assignors to Weyerhaeuser Company, Tacoma, Wash., a corporation of Washington
No Drawing. Filed June 7, 1962, Ser. No. 200,668
23 Claims. (Cl. 260—124)

This invention relates generally to the separation of valuable chemical products from the barks of trees. It pertains more particularly to the separation of wax products from aqueous alkaline tree bark extracts.

It has been recognized for some time that the barks of trees contain wax products useful in various important commercial applications such as the manufacture of floor waxes, polishes, coating agents, moisture proofing agents and the like. The waxes are present in the bark, however, admixed with a great number of other chemical entities of diverse properties and character. As a result, attempts to separate the waxes have resulted in the separation of a complex mixture of materials not demonstrating in aggregate the wax-like properties which determine the commerical applications of wax products. Furthermore, attempts to isolate the wax components selectively from the bark, or to refine the gross wax products obtained from that source, have been too complicated and expensive to be attractive commerically, or have produced such a low yield of wax as to be impractical.

Accordingly it is the object of this invention to provide a commercially applicable process for the extraction of high yields of commercially usable wax products from the barks of trees in which such products are contained.

The present invention is based upon the discovery that when tree barks containing wax are extracted with suitable aqueous bases, an alkaline extract results in which the wax components of the bark are present in a form in which they may be separated easily and selectively by treatment with a substantially water-insoluble liquid alcohol having from 4–12 carbon atoms inclusive. It has been found that the alcohol solvents of this class have the unique ability to dissolve selectively not only the neutral waxy materials, but also the waxy materials which are present in the alkaline extract as acid esters or as salts of long chain acids. The product contained in the resulting alcohol solution is a substantially all-wax product and represents substantially the total wax content of the alkaline bark extract. Accordingly, where the wax content of the bark is high, the yields of wax product obtained by the application of the present process also are high and of commercial interest.

Generally stated, the presently described process for separating wax products from bark comprises treating an aqueous, alkaline, tree bark extract at a pH of at least 6 with a substantially water-insoluble, liquid alcohol such as amyl alcohol, having from 4–12 carbon atoms inclusive. The treating temperature may range between the freezing temperature and the boiling temperature of the mixture. The time of treatment is merely that required to dissolve selectively in the alcohol a substantial proportion of the wax content of the extract, a result which may be achieved in the time of but a few minutes.

The resulting alcohol phase, which contains the wax products, is separated from the resulting aqueous alkaline phase containing the residual content of the bark extract. The alcohol phase then may be acidified, washed with water to remove inorganic salts, and distilled for removal of the alcohol. The residue is dried to provide a commercially acceptable wax product.

The presently described process may be applied broadly to alkaline extracts derived from the barks, or the mechanically separated fractions of the barks of any species of tree, either coniferous or deciduous, which contain wax in their barks. Illustrative coniferous species thus are the Douglas fir, white fir, grand fir, ponderosa pine, lodgepole pine, short leaf pine, loblolly pine, Sitka spruce, western hemlock, western red cedar, and redwood. Illustrative deciduous species are alder, red gum, and yellow birch. Of the foregoing, the barks of the Douglas fir and lodgepole pine are of particular interest because of their high content of wax.

In general, the barks of the foregoing and other trees may be extracted with alkali using any aqueous solution and any conditions of treatment which will result in the non-selective extraction of the desired wax products in good yield. Aqueous solutions of the basic acting compounds of the alkali metals and ammonia thus broadly are applicable, illustrative members of this group being sodium hydroxide, potassium hydroxide, sodium carbonate, sodium bicarbonate, ammonium carbonate and borax. Other inorganic or organic alkaline materials may be employed, however, if they have the capacity of dissolving the waxy components of the bark.

The alkaline extraction may be carried out either batchwise or continuously by treating the bark, previously ground or milled to a suitable particle size, with the selected alkaline agent in aqueous medium under conditions of concentration, consistency, temperature and time calculated to extract the waxy and other components of the bark in high yield.

In a typical extraction procedure the bark is ground to a particle size such that a major portion passes an 8 mesh screen but is retained on an 80 mesh screen (U.S. Sieve Series). It then is treated with aqueous sodium hydroxide, potassium hydroxide, or other alkaline reacting substances using from 10–20% by weight of the latter, based on the dry weight of the bark, at a bark consistency of 10–25% and at elevated temperature for a time sufficient to extract the desired materials from the bark. The resulting extract phase then is separated from the solid residue.

The extract obtained in this manner contains a highly complex mixture of materials, including the waxy materials which it is desired to isolate by the presently described process. In general, it includes the following classes of materials, which either are present as such in the original bark, or are derived therefrom by hydrolysis or other chemical reaction during the alkaline extraction.

Waxy components:
  Salts of fatty acids
  Salts of hydroxy fatty acids
  Salts of phenolic fatty acid esters
  Neutral esters of fatty acids
  Long chain alcohols
  Sterols Nonwaxy components:
  Salts of monomeric and polymeric phenolic substances
  Salts of monomeric and polymeric phenolic acid substances.

It is the concern of the present invention, therefore, to achieve an effective separation of these two groups of materials.

As has been indicated above, this separation is accomplished by treating the alkaline bark extract with a substantially water-insoluble, liquid alcohol having from 4–12 carbon atoms, solvents of this class having the unique property of dissolving selectively the waxy components of the alkaline extract even though they are present in the form of their alkaline salts.

To prepare the alkaline extract for treatment with the alcohol, it first is necessary to insure that the extract has a pH of at least 6, preferably of 8–12, and most preferably, for obtaining specialized wax products, of from 9.5–10.5. Proper control of the pH of the extract is of importance for two reasons.

In the first place, if the pH is highly acid, i.e., below 6, treatment of the extract with the alcohol solvent results in the solution and separation of a large proportion of the organic content of the extract. However, the organic content removed under acidic treatment includes a very large proportion of non-waxy materials with the result that a gross product is obtained from which it is difficult and impractical to separate the waxes. On the other hand, if the pH is maintained at a level of above 6, preferably from 8–12, less of the organic content of the extract is removed by treatment with alcohol. However, this latter organic content is substantially all wax in character.

Secondly, if the treatment with alcohol is carried out at a pH of less than 6, a 3-phase system is obtained, the phases being an alcohol phase, an aqueous phase, and a solid phase. From an engineering standpoint such a three-phase system is difficult to process satisfactorily for the selective recovery of the waxy component.

Any suitable procedure may be employed to adjust the pH to the stipulated level and to maintain it at that level. Thus the extract may be treated with acids or bases or acidic or basic salts in the amount predetermined to achieve the desired pH level.

After adjustment of its pH, the extract is treated with an alcohol which, as indicated above, broadly comprises a substantially water-insoluble 4–12 carbon atom alcohol which is liquid at the treating temperature. Illustrative of such alcohols are n-decyl alcohol, 5-ethyl 2-nonanol, dodecyl alcohol, benzyl alcohol and 2-ethyl 1,3 hexanediol. Alcohols which are especially siutable comprise the water-insoluble butyl, amyl, hexyl, heptyl and octyl alcohols. They may be used singly or in admixture with each other.

It is preferred to employ the commercially available products such as the mixture of amyl alcohols sold under the trade name of "Pentasol" and comprising a mixture of amyl alcohols, principally the three isomeric primary amyl alcohols derived from the oxidation of mixed pentanes.

The alcohols of the foregoing class may be monohydric or polyhydric in character and may have straight chain or branch chain structures. However, if alcohols have fewer than 4 carbon atoms are employed, their solubility in water becomes so complete that phase separation becomes impossible. Also, the use of alcohols having more than 12 carbon atoms per molecule is attended by slowness in establishing solvent-solute equilibrium and by difficulties created by the low volatility of the alcohol in distilling the alcohol from the wax.

In carrying out the treatment any desirable ratio of alcohol to alkaline extract may be employed. A suitable range of ratios is from 0.25–1 part by volume of alcohol to each part by volume of extract. However, this ratio may be modified in particular applications, as determined by the character of the extract, the identity of the alcohol and the other conditions of treatment.

Since the waxy substances are appreciably soluble in the alcohol, even at the freezing tempearture of the mixture, the treatment may be effectuated at a low temperature, if desired. However, it is preferred to carry it out at an elevated temperature at or near the boiling point of the system, a preferred range being between 50° C. and the system boiling point. At elevated temepratures the equilibrium between solvent and solute is established rapidly so that a treating time of only a few minutes is required.

The treatment with alcohol may be carried out in any suitable type of equipment, either batchwise or continuously, using as many applications of alcohol as desirable or necessary to separate the waxy components of the alkaline extract. Provision should be made in the apparatus for mixing the components of the system adequately, as well as for establishing and maintaining the desired treatment temperature. Pressure equipment may be employed where it is desired to carry out the treatment at temperaures above the normal boiling point of the system.

After the treatment has been completed, the alcohol phase is separated from the residual alkaline extract phase in a suitable manner, as by gravity settling or centrifuging. It contains dissolved and dispersed long chain alcohols and sterols, as well as the salts of various higher fatty acids, hydroxy fatty acids, neutral esters of fatty acids, and phenolic fatty acid esters. These wax products are different from the native wax content of the original bark in that they comprise in substantial measure the saponification product of the native wax, isolated in a yield substantially greater than that obtained by direct extraction of the bark with a wax solvent such as hexane. The waxy salt products may be separated from the solution by distilling off the alcohol.

However, in the preferred process, the waxy salt products are converted to the free waxes by acidification to a suitable pH level, i.e. to a level of less than 6, preferably less than 4. Any suitable acidic material may be used for this purpose such as for example, an aqueous solution of sulfuric acid, hydrochloric acid, or phosphoric acid.

After acidifications, the alcohol phase may be washed one or more times with hot water or other aqueous solvent, for removal of inorganic salts. The resulting washed alcohol solution then may be distilled, preferably steam distilled, for separation of the alcohol. This leaves a wax residue which, after drying, is suitable for refinement or direct application in various uses.

A further quantity of useful material, not primarily waxy in character, is contained in the aqueous alkaline phase separated from the alcohol phase. Hence the alkaline phase may be used per se, dried to give a useful dry residue, or acidified to give a useful acidified product.

The acidification may be carried out with sulfuric, hydrochloric, phosphoric or other suitable acid material to a pH lever at which the organic components of the extract will precipitate. In general, a pH of less than 4 is required for this purpose. The resulting solid product then may be separated from the acid solution. It comprises monomeric and polymeric phenolic acid materials, useful in various industrial applications.

The following examples illustrate the process of the present invention in its more specific embodiments.

EXAMPLE 1

This example illustrates the application of the present invention to separating wax products from the barks of various coniferous and deciduous species of trees.

Samples of bark were obtained from each of the following tree species:

Coniferous:
    Douglas fir (*Pseudotsuga taxifolia*)
    White fir (*Abies concolor*)
    Grand fir (*Abies grandis*)
    Ponderosa pine (*Pinus ponderosa*)
    Lodgepole pine (*Pinus contorta*)
    Short leaf pine (*Pinus echinata*)
    Loblolly pine (*Pinus taeda*)
    Sitka spruce (*Picea sitchensis*)
    Western hemlock (*Tsuga heterophylla*)
    Western red cedar (*Thuja plicata*)
    Redwood (*Sequoia sempervirens*)

Deciduous:
    Alder (*Alnus rubra*)
    Red gum (*Liquidamber sytraciflua*)
    Yellow birth (*Betula lutea*).

Representative samples of each bark were obtained by mixing pieces taken from each of several trees of the same species and washing and drying the pieces if necessary. They then were ground in a Wiley mill using a 3/16 inch opening screen.

Each bark sample was extracted separately, batchwise, with caustic soda, at a caustic soda use and a consistency determined by the viscosity characteristics of the resulting slurry, for a treatment time of one hour. The conditions of extraction for each species are indicated in Table I below.

At the end of the extraction period, the slurry was filtered hot through an 80–100 mesh screen. The aqueous alkaline extract was centrifuged to remove fines and then treated with carbon dioxide gas to adjust its pH to a value of 10.

Thereafter the extract was treated twice, batchwise, with equal volumes of mixed amyl alcohols ("Pentasol") at a temperature of 80–90° C. for a time of 3–4 minutes. This resulted in the formation of an aqueous alkaline phase and an alcohol phase. These were separated.

The aqueous alkaline phase was acidified to a pH of 2.5 with 20% sulfuric acid, resulting in the precipitation of the insoluble organic acid content of the alkaline extract phase.

The alcohol phase was acidified to a pH of 3.0 with 20% sulfuric acid after which it was washed two times with 1/4 volume of hot water for the removal of inorganic salts. The washed solution then was steam distilled to remove the alcohol, after which the waxy residue was dried in vacuo.

The conditions of alkaline extraction and the yields of products obtained are summarized in Table I below:

Table I
BARK EXTRACTION CONDITIONS AND YIELDS OF PRODUCTS

| Bark Species | Percent Consistency[a] | Percent NaOH[b] Usage | Percent Yield[c] Alkaline Extract | Percent Yield[c] Bark Residue |
|---|---|---|---|---|
| Coniferous: | | | | |
|   Douglas fir | 15.0 | 30.4 | 58.7 | 41.7 |
|   White fir | 15.0 | 31.3 | 51.3 | 53.4 |
|   Grand fir | 15.5 | 29.7 | 56.2 | 47.7 |
|   Ponderosa pine | 12.0 | 30.0 | 65.5 | 36.2 |
|   Lodgepole pine | 13.1 | 30.4 | 68.2 | 30.8 |
|   Short leaf pine | 13.7 | 30.0 | 56.4 | 44.1 |
|   Loblolly pine | 12.5 | 30.6 | 60.4 | 38.8 |
|   Sitka spruce | 15.4 | 30.0 | 60.3 | 42.4 |
|   Western hemlock | 15.0 | 31.1 | 53.0 | 46.7 |
|   Western red cedar | 8.7 | 29.7 | 46.3 | 53.7 |
|   Redwood | 7.1 | 31.6 | 41.7 | 60.0 |
| Deciduous: | | | | |
|   Alder | 15.1 | 31.0 | 46.2 | 54.9 |
|   Red gum | 15.6 | 33.1 | 46.7 | 54.9 |
|   Yellow birch | 15.5 | 30.3 | 47.2 | 50.8 |

[a] Weight of oven-dry bark divided by weight of slurry, i.e., weight of water plus sodium hydroxide plus oven-dry bark, times 100.
[b] Weight of sodium hydroxide divided by weight of oven-dry organics in bark, times 100.
[c] Based on organics.

The yields of the products obtained on fractionation of the alkaline extract, calculated on the basis of the organic content of the original bark are given in Table II below:

Table II
YIELDS OF PRODUCTS ON FRACTIONATION OF ALKALINE EXTRACT CALCULATED ON ORGANICS IN THE ORIGINAL BARK

| Wood Species | Percent Aqueous Residue From Alcohol Extraction | Percent Alcohol Solubles | Percent Acidified and Dried Wax |
|---|---|---|---|
| Coniferous: | | | |
|   Douglas fir | 53.4 | 7.6 | 6.7 |
|   White fir | 45.0 | 5.6 | 4.5 |
|   Grand fir | 49.7 | 6.2 | 5.7 |
|   Ponderosa pine | 59.9 | 5.2 | 5.3 |
|   Lodgepole pine | 56.0 | 11.9 | 11.3 |
|   Short leaf pine | 50.5 | 3.5 | 3.7 |
|   Loblolly pine | 53.8 | 3.9 | 3.4 |
|   Sitka spruce | 55.8 | 4.3 | 3.8 |
|   Western hemlock | 52.0 | 3.1 | 4.2 |
|   Western red cedar | 38.2 | 8.5 | 6.5 |
|   Redwood | 39.1 | 2.9 | 1.7 |
| Deciduous: | | | |
|   Alder | 44.0 | 2.3 | 2.9 |
|   Red gum | 43.9 | 2.8 | 2.9 |
|   Yellow birch | 38.2 | 8.2 | 10.1 |

Next the melting point, iodine number, and acid number of the wax product separated from the alkaline extract by treatment with the alcohol were determined. These values are given in Table III:

Table III
PROPERTIES OF THE ALCOHOL SOLUBLE FRACTION FROM THE ALKALINE EXTRACT

| Bark Species | Total Wax Product | | |
|---|---|---|---|
| | M.P., ° C. | Iodine No. | Acid No. |
| Coniferous: | | | |
|   Douglas fir | 62 | 20.4 | 83.9 |
|   White fir | 56–58 | 20.9 | 15.4 |
|   Grand fir | 45–48 | 41.9 | 98.9 |
|   Ponderosa pine | 37–40 | 39.1 | 103.9 |
|   Lodgepole pine | 25–28 | 63.0 | 114.4 |
|   Shortleaf pine | 43–47 | 43.7 | 96.5 |
|   Loblolly pine | 48–52 | 43.4 | 109.7 |
|   Sitka spruce | 28–35 | 45.6 | 90.1 |
|   Western hemlock | 52–53 | 25.7 | 28.1 |
|   Western red cedar | 43–45 | 42.8 | 101.5 |
|   Redwood | 60–100 | (*) | (*) |
| Deciduous: | | | |
|   Alder | 39–44 | 37 | 76.8 |
|   Red gum | 64–67 | 32 | 89.5 |
|   Yellow birch | 47–50 | 26 | 41.9 |

*Insoluble in reagents.

The amount of the wax product which was soluble in hexane also was measured, and the saponification number, acid number, ester number and melting point of the hexane soluble fraction determined. Still further the melting point of the hexane insoluble fraction of the wax was measured. The results are given in Table IV below:

*Table IV*

PROPERTIES OF THE PRODUCTS RESULTING FROM THE HEXANE FRACTIONATION OF THE TOTAL WAX PRODUCT

| Bark Species | Hexane Soluble Wax Fraction | | | | | Hexane insoluble Wax Fraction, M.P., °C. |
|---|---|---|---|---|---|---|
| | Percent Hexane Sol. | Saponification No. | Acid No. | Ester No. | M.P., °C. | |
| Coniferous: | | | | | | |
| Douglas fir | 91.8 | 138 | 81 | 57 | 62-64 | 115-118 |
| White fir | 83.6 | 153 | 8 | 145 | 62-65 | (²) |
| Grand fir | 68.4 | 155 | 103 | 52 | 42-45 | 105-110 |
| Ponderosa pine | 81.0 | 138 | 105 | 33 | 45-47 | 80- 86 |
| Lodgepole pine | 89.4 | 164 | 117 | 47 | 34-36 | 88- 96 |
| Short leaf pine | 85.7 | 140 | 95 | 45 | 42-45 | 100-106 |
| Loblolly pine | 81.4 | 160 | 116 | 44 | 36-54 | 135-145 |
| Sitka spruce | 78.2 | 136 | 109 | 27 | 30-40 | 140 |
| Western hemlock | 84.8 | 64 | 28 | 36 | 49-51 | 165-170 |
| Western red cedar | 49.2 | 166 | 100 | 66 | 28-31 | 100 |
| Redwood | 38.7 | 141 | 9 | 132 | ¹ 54 | (³) |
| Deciduous: | | | | | | |
| Alder | 45.9 | 156 | 127 | 29 | 33 | 60-110 |
| Red gum | 61.0 | 144 | 118 | 26 | 58 | 73-135 |
| Yellow birch | 18.5 | 160 | 69 | 91 | 48-53 | 33- 48 |

¹ Insoluble in reagents.
² Chars 260° C.
³ Chars 300° C.

EXAMPLE 2

This example illustrates the application of the presently described process to the separation of waxes from aqueous alkaline tree bark extracts prepared by extracting bark with alkaline materials other than caustic soda, i.e. with potassium hydroxide and ammonium hydroxide. It also illustrates the application of alcohols other than amyl alcohols in the extraction of wax products from aqueous bark extracts by the presently described process.

Samples of Douglas fir bark were extracted separately with potassium hydroxide and ammonium hydroxide, using one-half mole of base per 100 grams of oven dry bark. This is equivalent to a 20% usage of sodium hydroxide.

The extracts were prepared by refluxing the bark for one hour at 15% consistency. In the case of the ammonium hydroxide extraction, a trap was installed on the condenser to collect ammonia. The contents of the trap periodically were returned to the flask containing the bark.

In each case, the resulting slurry was filtered through a 100-mesh stainless steel screen, after which the filtrate was centrifuged to remove fines. The bark residue was washed thoroughly with hot water, dried, weighed, ashed and the yield calculated. The results obtained were compared with those resulting from a control run, using sodium hydroxide as the extracting agent:

*Table V*

BARK EXTRACTION CONDITIONS AND YIELDS OF PRODUCT

| Extraction Medium | Percent Ash D. Fir Bark | Percent Consistency ᵃ | Percent Usage of Base ᵇ | Percent Yield Solubles | Percent Yield Residue |
|---|---|---|---|---|---|
| Sodium Hydroxide | 1.1 | 15.0 | 30.4 | 58.7 | 41.7 |
| Potassium Hydroxide | 1.1 | 15.0 | 20.3 | 53.1 | 47.6 |
| Ammonium Hydroxide | 1.1 | 14.8 | 20.4 | 24.8 | 77.6 |

ᵃ Weight of oven dry bark divided by the weight of slurry (weight of bark plus base plus water) times 100.
ᵇ Weight of sodium hydroxide or other base calculated as equivalents of sodium hydroxide divided by the weight of oven dry, ash free bark times 100.

The clarified extracts from the above were extracted separately twice, each time with an equal volume of amyl alcohol solvent ("Pentasol"). The extractions were carried out at 80–90° C., the phases being contacted during each extraction by mechanical mixing for 15 minutes.

The alcohol solubles were acidified, washed, and the alcohol evaporated. The residue then was extracted with hexane with results as follows:

*Table VI*

SOLUBILITY OF VARIOUS ALKALINE EXTRACTS OF DOUGLAS FIR BARK IN AMYL ALCOHOL

| | Percent Soluble in Amyl Alcohol | | Percent Hexane Solubles in Amyl Alcohol | | |
|---|---|---|---|---|---|
| | 1 | 2 | 3 | 4 | 5 |
| NaOH Extract | 12.9 | 7.6 | 88.4 | 11.4 | 6.7 |
| KOH Extract | 14.2 | 7.5 | 79.0 | 11.2 | 5.9 |
| NH₄OH Extract | 15.6 | 3.9 | 42.2 | 6.6 | 1.6 |

1—Based on organics in the alkaline extract.
2—Based on original bark.
3—Based on organics in amyl alcohol solubles.
4—Based on organics in the alkaline extract.
5—Based on original bark.

Next, the sodium hydroxide extract of the Douglas fir bark was divided into six samples. Using the technique described in Example 1, each of the samples was extracted with a different alcohol. The solubility and yields of the resulting products are given below:

*Table VII*

SOLUBILITY OF WAXY CONSTITUENTS IN THE SODIUM HYDROXIDE EXTRACT OF DOUGLAS FIR BARK IN VARIOUS WATER INSOLUBLE LIQUID ALCOHOLS

| | Percent Soluble in Solvent | Percent Hexane Solubles in Solvent Solubles | |
|---|---|---|---|
| | 1 | 2 | 3 |
| Amyl Alcohol | 14.2 | 76.6 | 10.9 |
| Heptanol | 13.5 | 82.0 | 11.1 |
| Diisobutyl Carbinol | 9.6 | 89.8 | 8.6 |
| 2-ethyl 1, 3 hexanediol | 14.1 | 34.3 | 4.9 |
| n-Hexyl Carbitol | 18.6 | 21.2 | 3.9 |
| Benzyl alcohol | 13.7 | 51.8 | 7.1 |

1—Based on organics in the sodium hydroxide extract.
2—Based on solvent solubles.
3—Based on organics in the sodium hydroxide extract.

Thus it will be apparent that by the present invention we have provided a practical process for the separation of wax products from the barks of trees. The process is applicable to the recovery of the wax products in high yields, using relatively simple and inexpensive equipment. The wax products obtained, furthermore, are in large measure free from undesirable contaminants and in a form ready for refinement or use directly in various commercial applications.

Having thus described our invention in preferred embodiments we claim as new and desire to protect by Letters Patent:

1. The process of separating wax products from aqueous alkaline tree bark extracts which comprises treating the extract at a pH of at least 6 with a substantially water-insoluble liquid alcohol having from 4–12 carbon atoms inclusive, at a temperature of between the freezing temperature and the boiling temperature of the extract-alcohol mixture, for a time sufficient to dissolve selectively in the alcohol a substantial proportion of the wax content of the extract, thereby forming an alcohol phase containing the wax products and an aqueous alkaline phase containing the residual content of the bark extract, and separating the alcohol phase from the aqueous alkaline phase.

2. The process of claim 1 wherein the water-insoluble liquid alcohol is an aliphatic alcohol.

3. The process of claim 1 wherein the water-insoluble liquid is an aliphatic monohydric alcohol.

4. The process of claim 3 wherein the aqueous alkaline tree bark extract is an aqueous alkaline Douglas fir bark extract.

5. The process of claim 3 wherein the aqueous alkaline tree bark extract is an aqueous alkaline lodgepole pine bark extract.

6. The process of claim 3 wherein the aqueous alkaline tree bark extract is an aqueous caustic soda tree bark extract.

7. The process of claim 3 wherein the aqueous alkaline tree bark extract is an aqueous caustic soda extract of the bark of the Douglas fir.

8. The process of claim 3 wherein the aliphatic alcohol is butyl alcohol.

9. The process of claim 3 wherein the aliphatic alcohol is an amyl alcohol.

10. The process of claim 3 wherein the aqueous alkaline tree bark extract is treated with aliphatic alcohol at a pH of from 8–12.

11. The process of claim 3 followed by distilling off the alcohol from the waxy salt products.

12. The process of claim 3 followed by acidifying the alcohol phase to a pH of less than 6 and distilling off the alcohol from the resulting acidified wax product.

13. The process of claim 3 followed by the step of acidifying the alcohol phase to a pH of less than 4 and distilling off the alcohol from the resulting acidified wax product.

14. The process of claim 3 including the steps of acidifying the alcohol phase to a pH of less than 6, washing the acidified alcohol phase with water, steam distilling the acidified and washed alcohol phase for removal of the alcohol, and drying the resulting wax product.

15. The process of claim 3 including the step of drying the separated aqueous alkaline phase.

16. The process of claim 3 including the step of acidifying the separated aqueous alkaline phase to a pH of less than 6.

17. The process of claim 7, wherein the aqueous caustic soda Douglas fir tree bark extract is treated with aliphatic alcohol at a pH of from 8 to 12.

18. The process of separating wax products from aqueous caustic soda tree bark extracts which comprises treating the extract at a pH of from 8–12 with a substantially water-insoluble liquid amyl alcohol at a temperature of between the freezing and boiling temperatures of the mixture for a time sufficient to dissolve selectively in the alcohol a substantial proportion of the wax content of the extract, and separating the resulting wax-product-containing alcohol phase from the residue-containing aqueous alkaline phase.

19. The process of claim 18 wherein the tree bark extract is Douglas fir bark extract.

20. The aqueous alkaline phase product of the process of claim 3.

21. The wax product of the process of claim 11.

22. The dried aqueous alkaline phase product of the process of claim 15.

23. The acidified aqueous alkaline phase product of the process of claim 16.

References Cited by the Examiner

UNITED STATES PATENTS

| | | | |
|---|---|---|---|
| 2,662,893 | 12/1953 | Kurth | 260—412.8 |
| 2,781,336 | 2/1957 | Zenczak | 260—412.8 |
| 2,880,216 | 3/1959 | Burgon et al. | 260—412.5 |

CHARLES B. PARKER, *Primary Examiner.*

ABRAHAM H. WINKELSTEIN, *Examiner.*